United States Patent
Reddy (10) Patent No.: US 9,991,701 B2
(45) Date of Patent: Jun. 5, 2018

(54) DIRECT CURRENT POWER DISTRIBUTION AND CONVERSION SYSTEM

(71) Applicant: General Electric Company, Schenectady, NY (US)

(72) Inventor: Raghothama Reddy, Murphy, TX (US)

(73) Assignee: General Electric Company, Schenectady, NY (US)

( * ) Notice: Subject to any disclaimer, the term of this patent is extended or adjusted under 35 U.S.C. 154(b) by 313 days.

(21) Appl. No.: 14/884,275

(22) Filed: Oct. 15, 2015

(65) Prior Publication Data

US 2017/0110877 A1    Apr. 20, 2017

(51) Int. Cl.
| | | |
|---|---|---|
| *H02J 1/12* | (2006.01) | |
| *H02J 9/08* | (2006.01) | |
| *H02J 1/00* | (2006.01) | |
| *H02J 1/10* | (2006.01) | |
| *H02J 7/00* | (2006.01) | |
| H02J 1/06 | (2006.01) | |
| H02J 9/06 | (2006.01) | |

(52) U.S. Cl.
CPC ............... *H02J 1/00* (2013.01); *H02J 1/102* (2013.01); *H02J 1/12* (2013.01); *H02J 7/0063* (2013.01); H02J 1/06 (2013.01); H02J 9/061 (2013.01)

(58) Field of Classification Search
CPC ........ H02J 1/00; H02J 1/06; H02J 1/10; H02J 1/12; H02J 1/102; H02J 7/0063; H02J 9/06; H02J 9/061; H02J 2001/106; Y10T 307/62; Y10T 307/707
USPC .......................................................... 307/24
See application file for complete search history.

(56) References Cited

U.S. PATENT DOCUMENTS

| | | | |
|---|---|---|---|
| 5,073,848 A * | 12/1991 | Steigerwald | G05F 1/577 307/29 |
| 5,319,536 A | 6/1994 | Malik | |
| 7,557,464 B2 | 7/2009 | Wang et al. | |
| 9,698,589 B1 * | 7/2017 | Leyh | H02H 3/087 |
| 2005/0185352 A1 * | 8/2005 | Nguyen | H02J 1/10 361/90 |
| 2011/0187197 A1 | 8/2011 | Moth | |
| 2012/0161518 A1 * | 6/2012 | Schroeder | H02J 3/36 307/36 |

(Continued)

FOREIGN PATENT DOCUMENTS

| | | |
|---|---|---|
| CN | 102025155 A | 4/2011 |
| CN | 103236794 A | 8/2013 |

(Continued)

OTHER PUBLICATIONS

Choudhary V., et al., "Fault Tolerant Circuit Topology and Control Method for Input-Series and Output-Parallel Modular DC-DC Converters", Power Electronics, IEEE, Jan. 2008, vol. 23, No. 1, pp. 402-411.

(Continued)

*Primary Examiner* — Levi Gannon
(74) *Attorney, Agent, or Firm* — General Electric Company (57) ABSTRACT

A direct current (DC) power distribution system is provided. The system includes a plurality of DC power sources, a ring bus, and a plurality of power converters. Each DC power source of the plurality of DC power sources is coupled to the ring bus by a respective power converter of the plurality of power converters.

18 Claims, 7 Drawing Sheets

(56) References Cited

U.S. PATENT DOCUMENTS

| | | | | |
|---|---|---|---|---|
| 2012/0267952 A1* | 10/2012 | Ballatine | ............... | H02J 1/102 |
| | | | | 307/26 |
| 2013/0106184 A1* | 5/2013 | Hafner | ................... | H02H 7/268 |
| | | | | 307/29 |
| 2013/0200714 A1* | 8/2013 | Pan | ........................ | H02J 3/386 |
| | | | | 307/82 |
| 2014/0258573 A1* | 9/2014 | Johnson | ............ | H04L 12/40013 |
| | | | | 710/110 |
| 2016/0294214 A1* | 10/2016 | Mosman | ................ | H02J 9/061 |

FOREIGN PATENT DOCUMENTS

| | | |
|---|---|---|
| CN | 103346571 A | 10/2013 |
| CN | 103731062 A | 4/2014 |
| KR | 101417669 B1 | 7/2014 |

OTHER PUBLICATIONS

Johnson, B.K. et al., "An industrial power distribution system featuring UPS properties" Power Electronics Specialists Conference, 1993, PESC '93 Record., 24th Annual IEEE, Jun. 20-24, 1993, pp. 759-765, Seattle, WA.

* cited by examiner

DIRECT CURRENT POWER DISTRIBUTION AND CONVERSION SYSTEM

BACKGROUND

The field of the disclosure relates generally to electrical power distribution systems and, more particularly, to direct current (DC) distribution and conversion systems.

Some known power distributions systems supply DC power to one or more loads. The loads include, for example, and without limitation, a DC load, an alternating current (AC) load, or a combination of AC and DC loads. Power distribution systems use various protection devices to protect equipment and people in the event of a fault. Protection devices include, for example, and without limitation, circuit breakers and fuses. Generally, when a fault occurs, power is disconnected from the load until the fault is cleared.

Some known DC power distribution systems have critical loads that cannot tolerate losses of power. DC power distribution systems are designed to be as robust and reliable as can be reasonably achieved for a given installation, which varies with, for example, and without limitation, cost, size, weight, and capacity. One challenge in providing reliable quality power is the availability of the power source. When a fault occurs, a power source is often removed from service, resulting in a loss of power. To overcome the availability problem, DC power distribution systems are designed for multiple DC power sources. However, with such DC power distribution systems, stranded capacity from some DC power sources cannot be utilized to feed loads coupled to different DC power sources.

BRIEF DESCRIPTION

In one aspect, a direct current (DC) power distribution system is provided. The system includes a plurality of DC power sources, a ring bus, and a plurality of power converters. Each DC power source of the plurality of DC power sources is coupled to the ring bus by a respective power converter of the plurality of power converters.

In another aspect, a direct current (DC) power distribution system is provided. The system includes a first distribution bus configured to provide DC power, a second distribution bus configured to provide DC power, and a ring bus connecting the first distribution bus and the second distribution bus. The first distribution bus includes a first power converter, and the second distribution bus includes a second power converter.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

Figure 1:
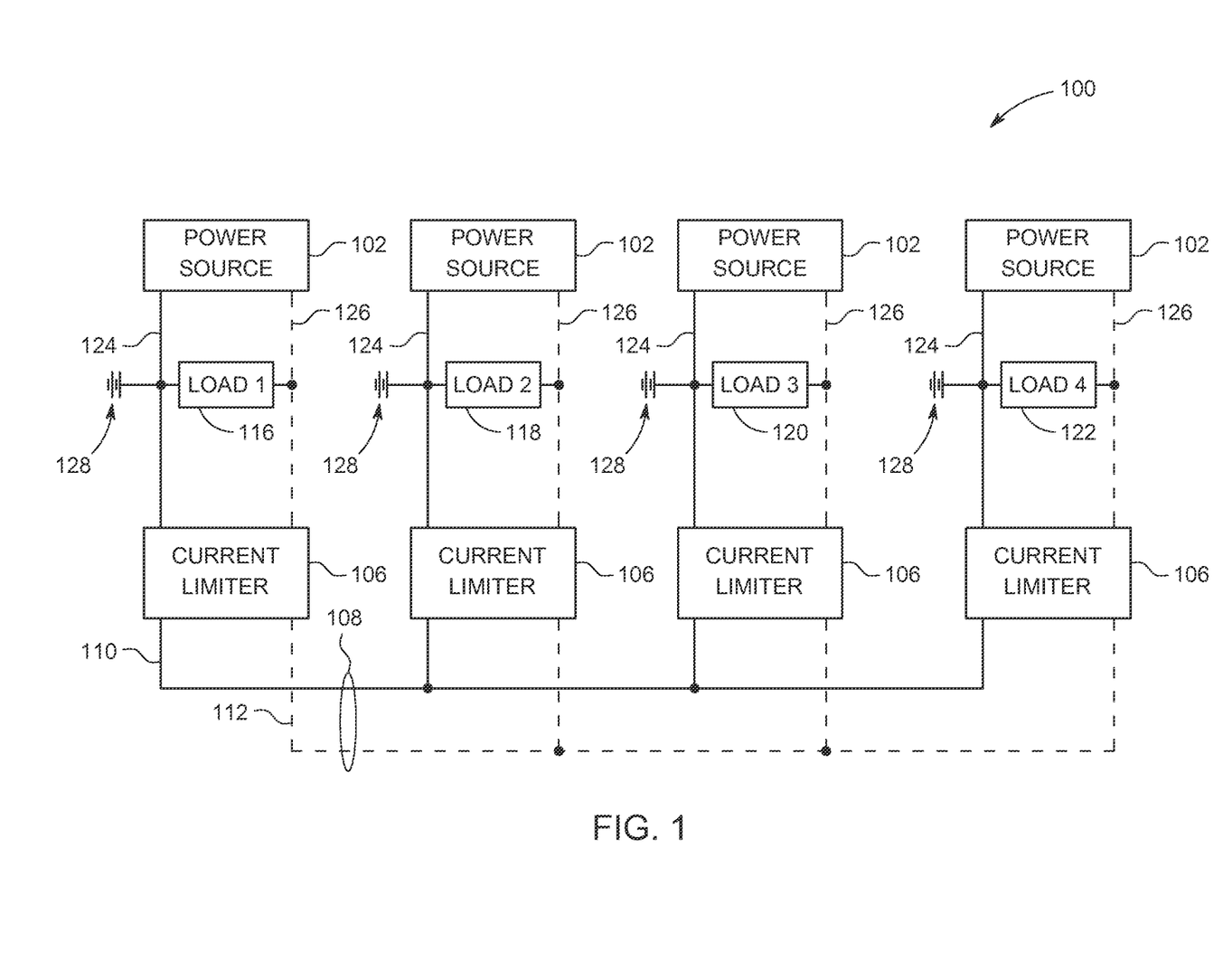
FIG. 1 is a block diagram of an exemplary DC power distribution system.

FIG. 1 is a diagram of an exemplary DC power distribution system 100. DC power distribution system 100 includes multiple power sources 102 coupled through protection assemblies (e.g., current limiting devices) 106 to a DC ring bus 108. DC ring bus 108 includes a positive DC ring bus 110 and a negative DC ring bus 112.

In the exemplary embodiment, DC power distribution system 100 further includes at least one of a first load 116, a second load 118, a third load 120, and a fourth load 122 coupled to DC ring bus 108 between respective power sources 102 and corresponding protection assemblies 106. In the event of a fault at one of power sources 102 or near one of loads 116, 118, 120, or 122 the corresponding protection assembly 106 isolates the fault from DC ring bus 108. By isolating the fault, the other three of power sources 102 continue supplying power and compensate for the lost power production of power source 102 on which the fault occurred.

In the exemplary embodiment, each protection assembly 106 is a bi-directional current limiting device such as a choke, a protection tie, or any other device that enables protection assembly 106 to function as described herein. Protection assembly 106 is configured to limit an amount of current that may be pushed into a faulty power source 102, so that power provided to loads 116, 118, 120, 122 is undisturbed. Protection assembly 106 is coupled between a source-side positive DC bus 124 and positive DC ring bus 110, and also between a source-side negative DC bus 126 and negative DC ring bus 112.

During normal operation, for both positive DC ring bus 110 and negative DC ring bus 112, current flows through protection assemblies 106. During a fault condition near one of loads 116, 118, 120, 122, current in protection assemblies 106 increases beyond a predefined limit in magnitude within a certain time period. When such a fault occurs, the current typically spikes higher in the nearer of protection assemblies 106, which is typically protection assemblies 106 for that particular power source 102. Further, during a fault condition, each protection assembly 106 presents an impedance to the current from other power sources 102. Protection assemblies 106 on the other power sources 102 limit current sourced by those power sources 102 to prevent them from feeding the fault.

In the exemplary embodiment, DC power distribution system 100 further includes a plurality of batteries 128, each battery 128 coupled to a respective load 116, 118, 120, 122. When a fault occurs at one of power sources 102 and DC ring bus 108 cannot provide all of the power required by a particular one of loads 116, 118, 120, or 122, battery 128 associated with the particular load 116, 118, 120, or 122 supplements the power provided by DC ring bus 108 or provides all of the power.

Figure 2:
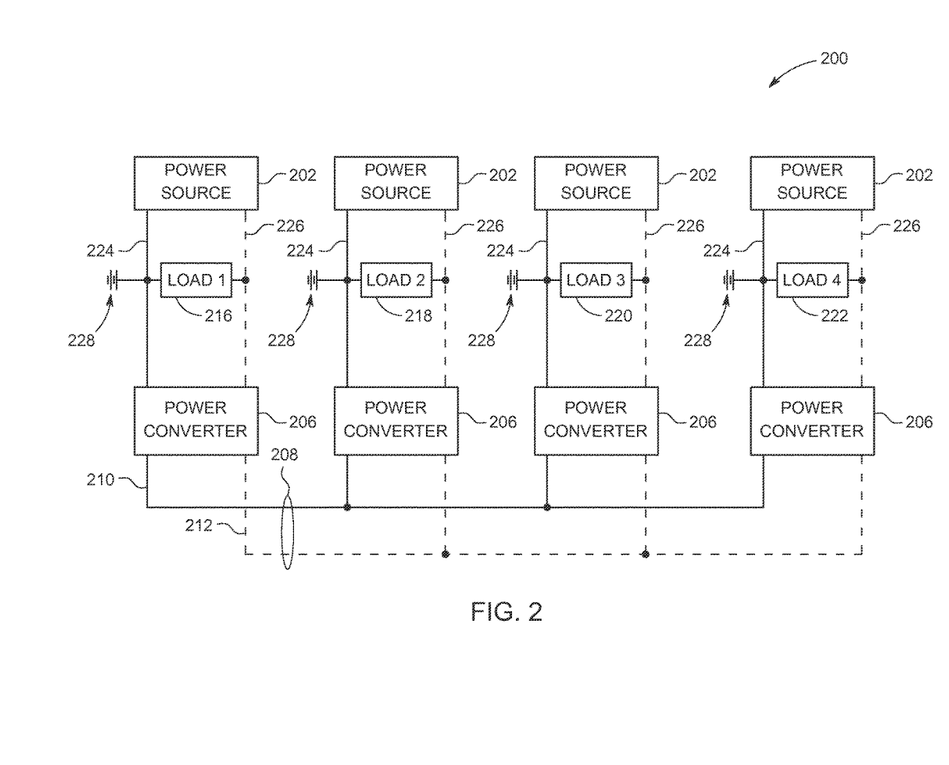
FIG. 2 is a block diagram of an exemplary DC power distribution system.

FIG. 2 is a diagram of an exemplary DC power distribution system 200. DC power distribution system 200 includes multiple power sources 202 coupled through power converters 206 to a DC ring bus 208. DC ring bus 208 includes a positive DC ring bus 210 and a negative DC ring bus 212.

In the exemplary embodiment, DC power distribution system 200 further includes at least one of a first load 216, a second load 218, a third load 220, and a fourth load 222 coupled to DC ring bus 208 between respective power sources 202 and corresponding power converters 206. In the event of a fault at one of power sources 202 or near one of loads 216, 218, 220, or 222, a circuit breaker (not shown) isolates the fault from DC ring bus 208. By isolating the fault, the other three of power sources 202 continue supplying power to DC ring bus 208 and compensate for the lost power production of power source 202 on which the fault occurred.

In the exemplary embodiment, power converters 206 are bi-directional power converters such as bi-directional DC-DC converters. Power converters 206 are coupled between a source-side positive DC bus 224 and positive DC ring bus 210, and also between a source-side negative DC bus 226 and negative DC ring bus 212. Power converters 206 are configured to enable transformation of power supplied from power sources 202 to DC ring bus 208, and from DC ring bus 208 to one or more of loads 216, 218, 220, or 222. More specifically, DC power provided by each power source 202 is converted to a different level of DC power associated with DC ring bus 208. If a particular power source 202 experiences a fault, power converter 206 associated with that particular power source 202 draws excess power from DC ring bus 208 and converts it to a level required by its corresponding load 216, 218, 220, or 222. Such voltage transformation enables the voltages output by each power converter 206 to DC ring bus 208 to be independent of each other.

In the exemplary embodiment, DC power distribution system 200 further includes a plurality of batteries 228, each battery 228 coupled to a respective load 216, 218, 220, 222. When a fault occurs at one of power sources 202 and DC ring bus 208 cannot provide all of the power required by a particular one of loads 216, 218, 220, or 222, battery 228 associated with the particular load 216, 218, 220, or 222 supplements the power provided by DC ring bus 208 or provides all of the power.

During normal operation, when DC power distribution system 200 is in a balanced state, all of the power provided by respective power sources 202 is fed to respective loads 216, 218, 220, 222. If, for example, a fault occurs in power source 202 associated with first load 216, power sources 218, 220, and 222 generate excess power that is provided to DC ring bus 208 via power converters 206. Because power source 202 associated with first load 216 cannot provide power required by first load 216, power converter 206 associated with first load 216 draws DC power from DC ring bus 206. Power converter 206 converts the DC power to a level required by first load 216 and provides it to first load 216. DC ring bus 208 functions similarly to a DC micro-grid where power converters 206 may provide and receive power to maintain load sharing across upstream power sources 202. DC power distribution system 200 provides parallel paths to from each power source 202 through DC ring bus 208 and through each load 216, 218, 220, 222 for system redundancy.

Figure 3:
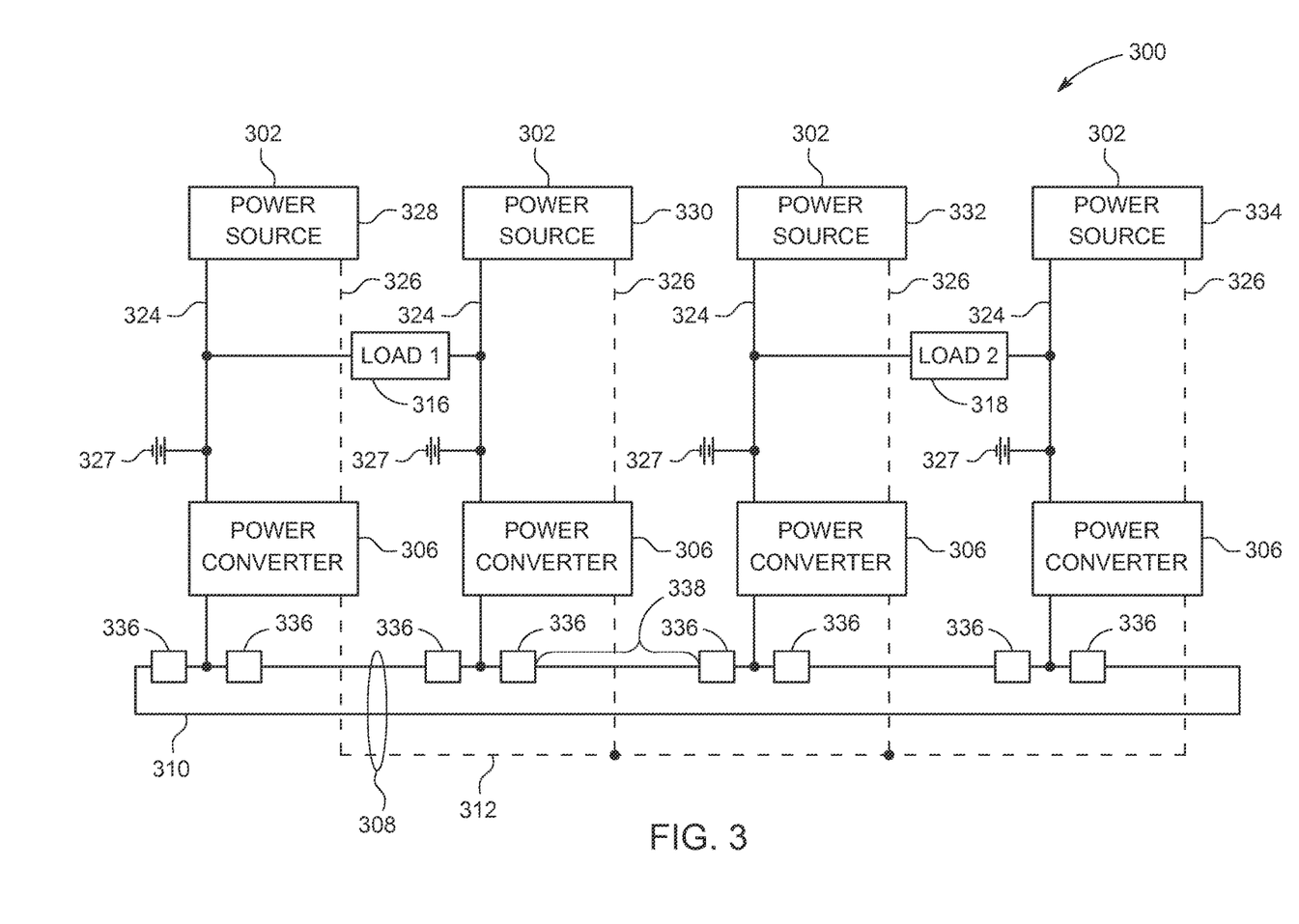
FIG. 3 is a block diagram of an exemplary DC power distribution system.

FIG. 3 is a diagram of an exemplary DC power distribution system 300. DC power distribution system 300 includes multiple power sources 302 coupled through power converters 306 to a DC ring bus 308. DC ring bus 308 includes a positive DC ring bus 310 and a negative DC ring bus 312.

In the exemplary embodiment, DC power distribution system 300 further includes a first dual-corded load 316 and a second dual-corded load 318 coupled to DC ring bus 308 between respective power sources 302 and corresponding power converters 306. A dual-corded load is one that is coupled in parallel between two or more power sources. More specifically, first load 316 is coupled to a source-side positive DC bus 324 of both a first power source 328 and a second power source 330 of power sources 302. Second load 318 is coupled to a source-side positive DC bus 324 of both a third power source 332 and a fourth power source 334 of power sources 302.

In the exemplary embodiment, power converters 306 are bi-directional power converters such as bi-directional DC-DC converters. Power converters 306 are coupled between a source-side positive DC bus 324 and positive DC ring bus 310, and also between source-side negative DC bus 326 and negative DC ring bus 312. Power converters 306 are configured to enable transformation of power supplied from power sources 302 to DC ring bus 308, and from DC ring bus 308 to one or more of loads 316, 318. If a particular power source 302 experiences a fault, power converter 306 associated with that particular power source 302 draws excess power from DC ring bus 308 and converts it to a level required by its corresponding load 316, 318. Such voltage transformation enables the voltages output by each power converter 306 to DC ring bus 308 to be independent of each other.

In the exemplary embodiment, DC power distribution system 300 further includes a plurality of batteries 327, each battery 327 coupled to a respective source-side positive DC bus 324 and load 316, 318. When a fault occurs at one of power sources 302 and DC ring bus 308 cannot provide all of the power required by a particular one of loads 316, 318, battery 327 associated with the particular load 316, 318, supplements the power provided by DC ring bus 308 or provides all of the power.

In the exemplary embodiment, positive DC ring bus 310 includes protection devices 336 coupled to each of a first and second side of an output connection of each power converter 306 on positive DC ring bus 310. Protection device 336 may be a current limiting device, a circuit breaker, or any other device that enables protection device 336 to function as described herein. In the event of a fault on positive DC ring bus 310, corresponding protection devices 336 disconnect the faulty segment of positive DC ring bus 310 to isolate the fault. By isolating the faulty segment on DC ring bus 308, DC power may still be provided to or from any of power converters 306 to loads 316, 318.

During normal operation, when DC power distribution system 300 is in a balanced state, DC power is provided to first load 316 by power sources 328, 330, and DC power is provided to second load 318 by power sources 332, 334. If, for example, a fault occurs on positive DC ring bus 310 on a segment 338, protection devices 336 at each end of segment 338 activate to disconnect segment 338 from DC ring bus 308. Although power cannot be provided over segment 338, the architecture of DC ring bus 308 enables each of power converters 306 to draw power from DC ring bus 308 during the fault. Accordingly, DC ring bus 308 functions similarly to a DC micro-grid where power converters 306 may provide and receive power to maintain load sharing across upstream power sources 302, and protection devices 336 provide fault isolation within DC ring bus 308.

Figure 4:
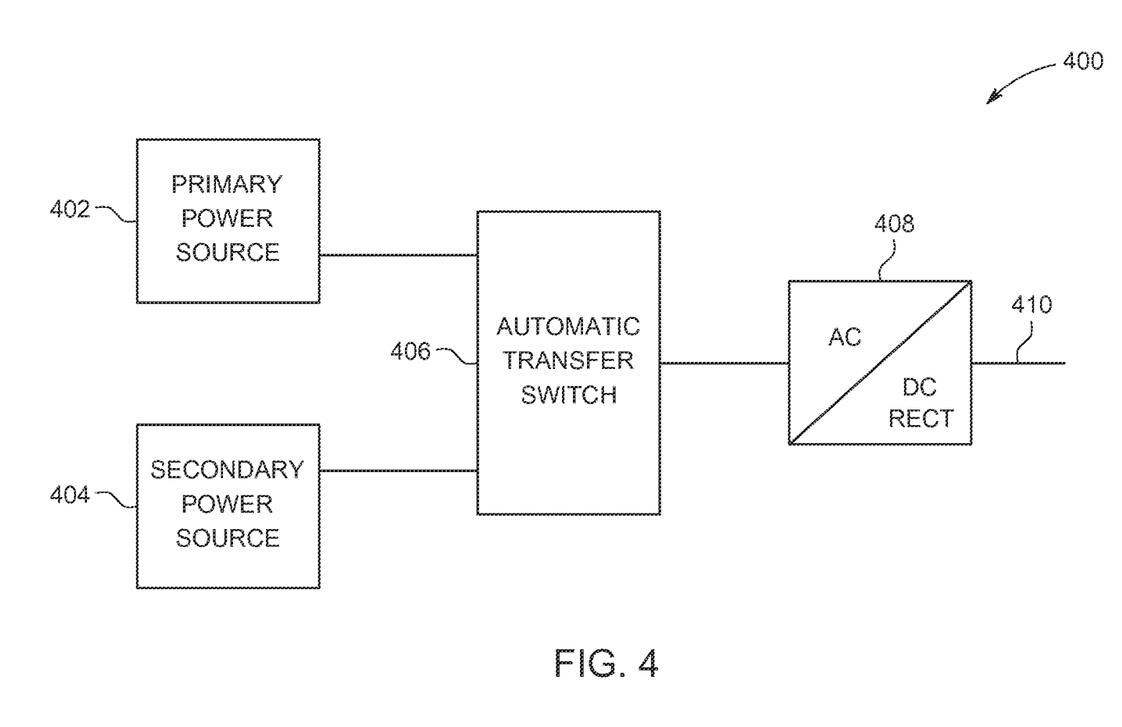
FIG. 4 is a schematic diagram of an exemplary power source for use in the DC power distribution system shown in FIGS. 1, 2, and 3.

FIG. 4 is a schematic diagram of an exemplary power source 400 for use in DC power distribution system 100 (shown in FIG. 1), DC power distribution system 200

(shown in FIG. 2), and DC power distribution system 300 (shown in FIG. 3). Power source 400 includes a primary power source 402 and a secondary power source 404. Primary power source 402 and secondary power source 404 are coupled to an automatic transfer switch 406 that is further coupled to a rectifier 408. Rectifier 408 is then coupled to a DC bus 410.

Automatic transfer switch 406 detects whether primary power source 402 is supplying power. When primary power source 402 is supplying power, automatic transfer switch 406 couples primary power source 402 to rectifier 408. When primary power source 402 is not supplying power, automatic transfer switch 406 decouples primary power source 402 and couples secondary power source 404 to rectifier 408 in its place. Supplied AC power arrives at rectifier 408, which converts it to a DC power that is put onto DC bus 410. Specifically, rectifier 408 is a two-stage AC-DC power converter that converts input AC power to a high-level DC power, and converts the high-level DC power to a lower DC power that is supplied to DC bus 410.

Primary power source 402 and secondary power source 404 include, for example, and without limitation, an electric grid, generator, photovoltaic, wind farm, hydro-electric, or any other suitable electric power source.

Figure 5:
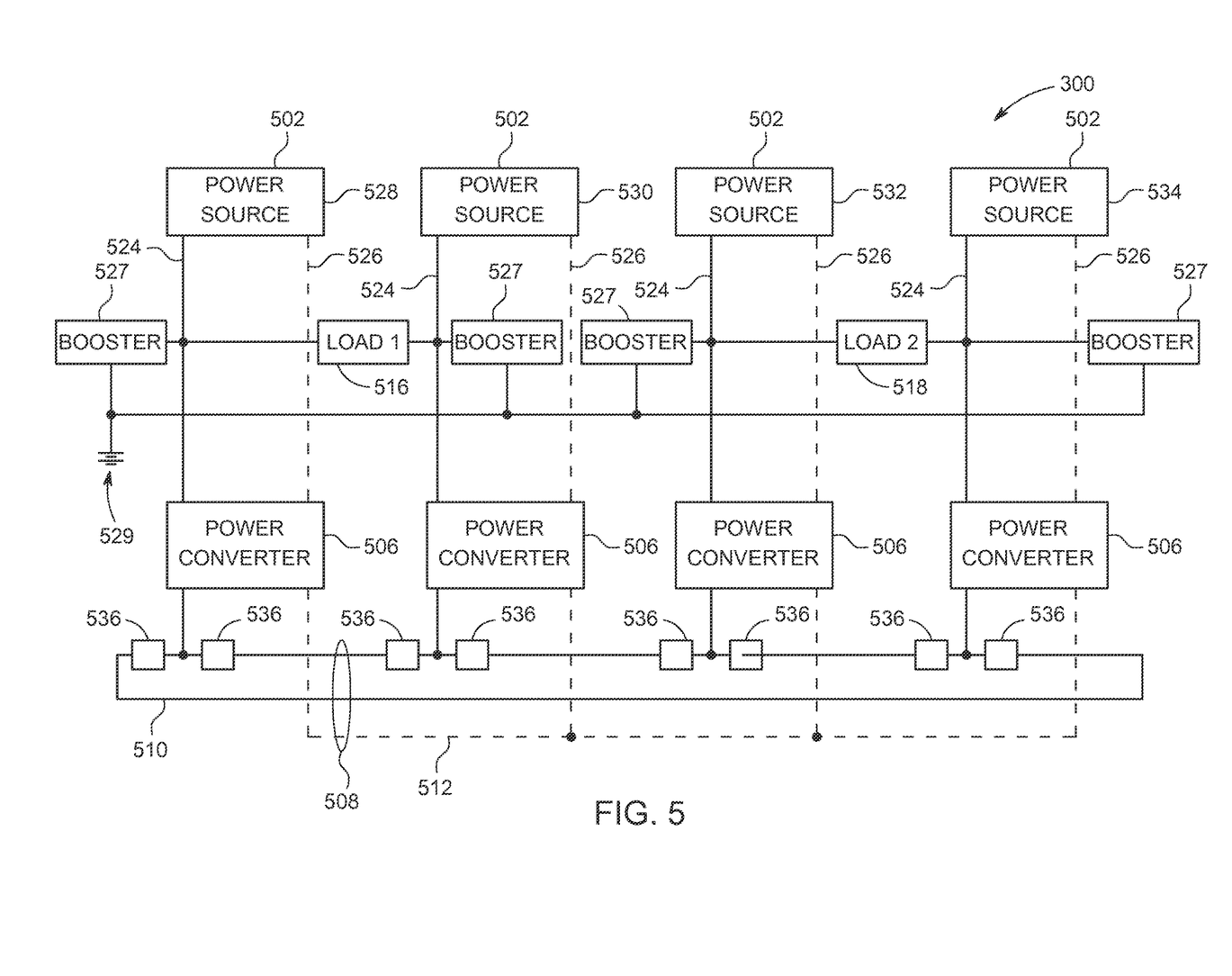
FIG. 5 is a block diagram of an exemplary DC power distribution system.

FIG. 5 is a diagram of an exemplary DC power distribution system 500. DC power distribution system 500 includes multiple power sources 502 coupled through power converters 506 to a DC ring bus 508. DC ring bus 508 includes a positive DC ring bus 510 and a negative DC ring bus 512.

In the exemplary embodiment, DC power distribution system 500 further includes a first dual-corded load 516 and a second dual-corded load 518 coupled to DC ring bus 508 between respective power sources 502 and corresponding power converters 506. A dual-corded load is one that is coupled in parallel between two or more power sources. More specifically, first load 516 is coupled to a source-side positive DC bus 524 of both a first power source 528 and a second power source 530 of power sources 502. Second load 518 is coupled to a source-side positive DC bus 524 of both a third power source 532 and a fourth power source 534 of power sources 502.

In the exemplary embodiment, power converters 506 are bi-directional power converters such as bi-directional DC-DC converters. Power converters 506 are coupled between source-side positive DC bus 524 and positive DC ring bus 510, and also between a source-side negative DC bus 526 and negative DC ring bus 512. Power converters 506 are configured to enable transformation of power supplied from power sources 502 to DC ring bus 508, and from DC ring bus 508 to one or more of loads 516 or 518. If a particular power source 502 experiences a fault, power converter 506 associated with that particular power source 502 draws excess power from DC ring bus 508 and converts it to a level required by its corresponding load 516, 518. Such voltage transformation enables the voltages output by each power converter 506 to DC ring bus 508 to be independent of each other.

In the exemplary embodiment, DC power distribution system 500 further includes a plurality of boosters 527, each booster 527 coupled to a respective source-side positive DC bus 524 and a respective load 516, 518. Each booster 527 is coupled to a centralized battery 529. When a fault occurs at one of power sources 502 and DC ring bus 508 cannot provide all of the power required by a particular one of loads 516, 518, battery 529 provides highly regulated DC power to loads 516, 518 using boosters 527. Boosters 527 enable each battery 529 to operate independently from each other.

In the exemplary embodiment, positive DC ring bus 510 includes protection devices 536 coupled to each of a first and second side of an output connection of each power converter 506 on positive DC ring bus 510. Protection device 536 may be a current limiting device, a circuit breaker, or any other device that enables protection device 536 to function as described herein. In the event of a fault on positive DC ring bus 510, corresponding protection devices 536 disconnect the faulty segment of positive DC ring bus 510 to isolate the fault. By isolating the faulty segment on DC ring bus 508, DC power may still be provided to or from any of power converters 506 to loads 516, 518.

Figure 6:
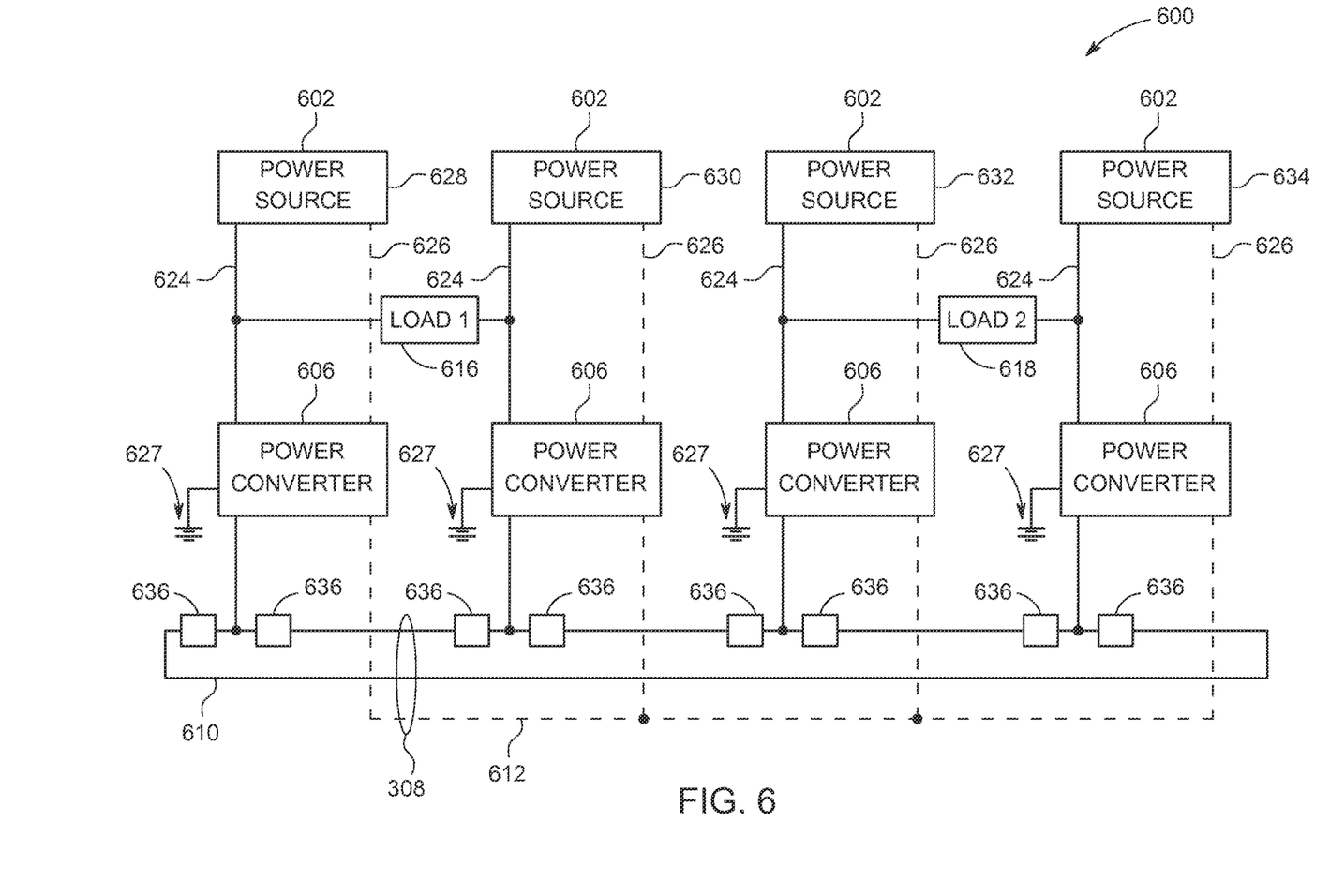
FIG. 6 is a block diagram of an exemplary DC power distribution system.

FIG. 6 is a diagram of an exemplary DC power distribution system 600. DC power distribution system 600 includes multiple power sources 602 coupled through power converters 606 to a DC ring bus 608. DC ring bus 608 includes a positive DC ring bus 610 and a negative DC ring bus 612.

In the exemplary embodiment, DC power distribution system 600 further includes a first dual-corded load 616 and a second dual-corded load 618 coupled to DC ring bus 608 between respective power sources 602 and corresponding power converters 606. A dual-corded load is one that is coupled in parallel between two or more power sources. More specifically, first load 616 is coupled to a source-side positive DC bus 624 of both a first power source 628 and a second power source 630 of power sources 602. Second load 618 is coupled to a source-side positive DC bus 624 of both a third power source 632 and a fourth power source 634 of power sources 602.

In the exemplary embodiment, DC power distribution system 600 further includes a plurality of batteries 627, each battery 627 coupled to a respective power converter 606. Battery 627 provides power to power converter 606 when its voltage is higher than voltage on DC ring bus 608 and voltage provided by power source 602.

In the exemplary embodiment, power converters 606 are tri-port power converters such as tri-port DC-DC converters. Power converters 606 are coupled between source-side positive DC bus 624 and positive DC ring bus 610, and also between a source-side negative DC bus 626 and negative DC ring bus 612. Power converters 606 are configured to enable transformation of power supplied from power sources 602 to DC ring bus 608, from DC ring bus 608 to one or more of loads 616 or 618, and from battery 627 to loads 616, 618 or DC ring bus 608. A particular power converter 606 determines whether power needs to be delivered to a load 616, 618 or to DC ring bus 608 to feed the other of load 616, 618. Power converter 606 then determines which of power source 602, DC ring bus 608, and battery 627 is providing the most power, and draws DC power from the highest-power source. If a particular power source 602 experiences a fault, power converter 606 associated with that particular power source 602 draws excess power from DC ring bus 608 and converts it to a level required by its corresponding load 616, 618. Such voltage transformation enables the voltages output by each power converter 606 to DC ring bus 608 to be independent of each other.

In the exemplary embodiment, positive DC ring bus 610 includes protection devices 636 coupled to each of a first and second side of an output connection of each power converter 606 on positive DC ring bus 610. Protection device 636 may be a current limiting device, a circuit breaker, or any other device that enables protection device 636 to function as described herein. In the event of a fault on positive DC ring bus 610, corresponding protection devices 636 disconnect the faulty segment of positive DC ring bus 610 to isolate the fault. By isolating the faulty segment on DC ring bus 608, DC power may still be provided to or from any of power converters 606 to loads 616, 618.

Figure 7:
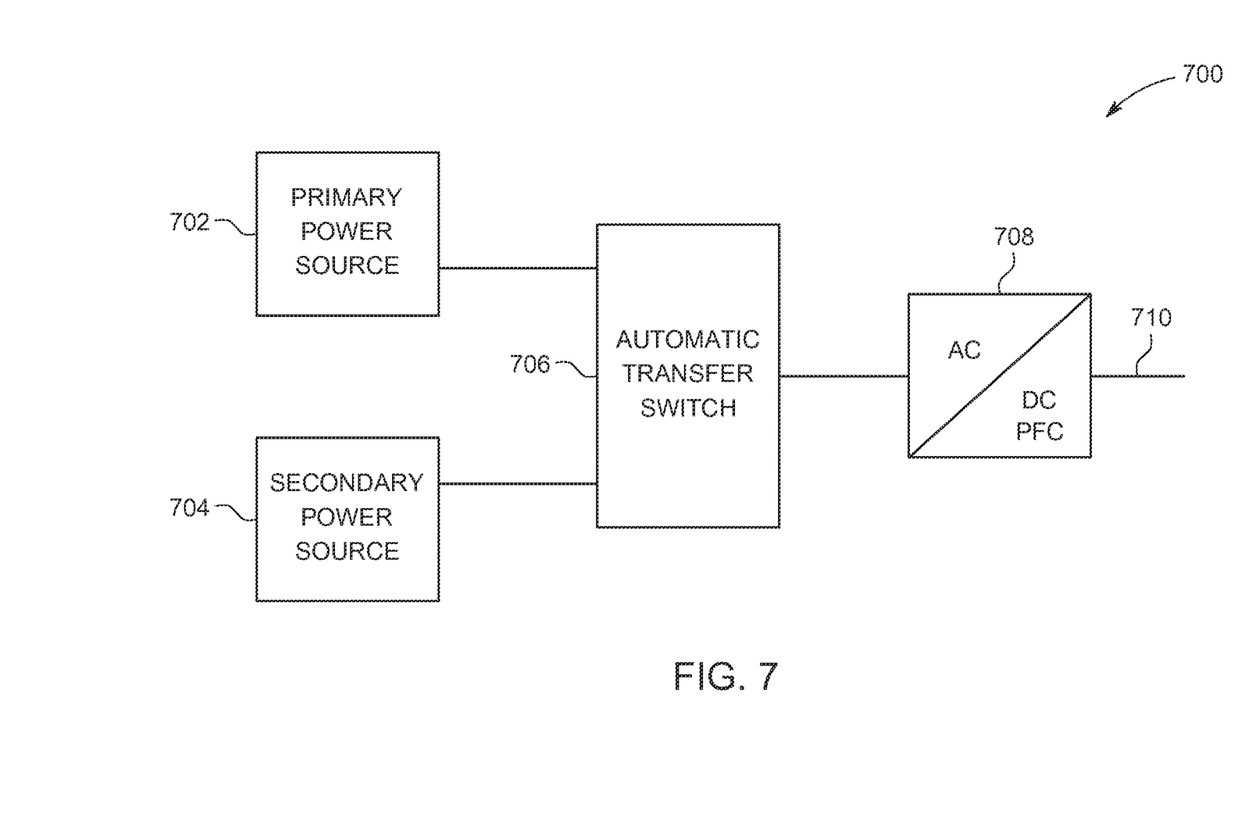
FIG. 7 is a schematic diagram of an exemplary power source for use in the DC power distribution system shown in FIGS. 5 and 6.

FIG. 7 is a schematic diagram of an exemplary power source 700 for use in DC power distribution system 500 (shown in FIG. 5) and DC power distribution system 600 (shown in FIG. 6). Power source 700 includes a primary power source 702 and a secondary power source 704. Primary power source 702 and secondary power source 704 are coupled to an automatic transfer switch 706 that is further coupled to a rectifier 708. Rectifier 708 is then coupled to a DC bus 710.

Automatic transfer switch 706 detects whether primary power source 702 is supplying power. When primary power source 702 is supplying power, automatic transfer switch 706 couples primary power source 702 to rectifier 708. When primary power source 702 is not supplying power, automatic transfer switch 706 decouples primary power source 702 and couples secondary power source 704 to rectifier 708 in its place. Supplied AC power arrives at rectifier 708, which converts it to a DC power that is put onto DC bus 710. Specifically, rectifier 708 is a power factor correction (PFC) rectifier that shapes input current and feeds the resulting DC power that results from the rectification to DC bus 710.

Primary power source 702 and secondary power source 704 include, for example, and without limitation, an electric utility, an electric grid, a generator, a photovoltaic device, a wind farm, a hydro-electric device, or any other suitable electric power source.

Embodiments of the present disclosure relate to electrical power distribution systems. The direct current (DC) power distribution systems described herein facilitate power sharing among multiple energy sources and, more specifically, a DC ring bus architecture with improved fault isolation. The DC power distribution systems described herein provide redundant parallel power paths to power one or more loads and also provide active power conversion between a plurality of power sources and a DC ring bus that provide and receive power to maintain load sharing across all upstream power sources. Because DC power is provided to the ring bus, rather than AC power, sharing of multiple loads across different power sources is more efficient and cost effective. The improved system availability and reliability of the DC power distribution systems provides a reduced component count and lower cost of ownership.

An exemplary technical effect of the methods, systems, and apparatus described herein includes at least one of: (a) power sharing among multiple energy sources; (b) improved power availability to loads as a result of multiple energy sources; (c) improved ring bus fault isolation; (d) improved distribution system reliability as a result of ring bus fault isolation; and (e) reduced operational cost due to reliability improvements.

Exemplary embodiments of electrical power distribution systems are not limited to the specific embodiments described herein, but rather, components of systems and/or steps of the methods may be utilized independently and separately from other components and/or steps described herein. For example, the methods may also be used in combination with other non-conventional electrical power distribution systems, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct current (DC) power distribution system comprising:
    a plurality of DC power sources;
    a ring bus; and
    a plurality of power converters, each DC power source of said plurality of DC power sources coupled to said ring bus by a respective power converter of said plurality of power converters, wherein each power converter of said plurality of power converters is configured to transform power supplied from a respective DC power source to said ring bus and transform power supplied by said ring bus to at least one load of a plurality of loads, the at least one load coupled in electrical parallel between the respective DC power source and the respective power converter such that the at least one load is isolated from said ring bus.

2. A DC power distribution system in accordance with claim 1, wherein each power converter of said plurality of power converters is configured to provide and receive power to maintain load sharing across said plurality of DC power sources.

3. A DC power distribution system in accordance with claim 1, wherein the coupling of each DC power source to said ring bus by said respective power converter defines a plurality of parallel power paths through said ring bus.

4. A DC power distribution system in accordance with claim 1, wherein each power converter of said plurality of power converters comprises a bi-directional DC-DC power converter.

5. A DC power distribution system in accordance with claim 1, further comprising a plurality of batteries, each battery of said plurality of batteries coupled to a respective load of said plurality of loads.

6. A DC power distribution system in accordance with claim 1, wherein said ring bus comprises a positive ring bus and a negative ring bus.

7. A DC power distribution system in accordance with claim 6, wherein said ring bus comprises a plurality of pairs of protection devices, each pair of protection devices coupled to each side of an output connection of each power converter to said positive ring bus.

8. A DC power distribution system in accordance with claim 7, wherein each protection device comprises one of a current limiting device and a circuit breaker.

9. A DC power distribution system in accordance with claim 1, further comprising a plurality of source-side positive DC buses, each source-side positive DC bus connected to an output of each respective DC power source.

10. A DC power distribution system in accordance with claim 9, further comprising:
   a first dual-corded load coupled to said source-side positive DC buses of both a first power source and a second power source of said plurality of power sources; and
   a second dual-corded load coupled to said source-side positive DC buses of both a third power source and a fourth power source of said plurality of power sources.

11. A DC power distribution system in accordance with claim 10, further comprising:
   a centralized battery; and
   a plurality of boosters, each booster coupled to a respective load via a respective source-side positive DC bus and to said centralized battery.

12. A DC power distribution system in accordance with claim 1, wherein each power converter of said plurality of power converters comprises a tri-port DC-DC power converter comprising:
   a first port coupled to an output of a respective DC power source;
   a second port coupled to said ring bus; and
   a third port coupled to a battery.

13. A direct current (DC) power distribution system comprising:
   a first distribution bus configured to provide DC power, said first distribution bus comprising a first power converter;
   a second distribution bus configured to provide DC power, said second distribution bus comprising a second power converter; and
   a ring bus connecting said first distribution bus and said second distribution bus,
   wherein said first power converter is configured to transform power supplied from a first DC power source to said ring bus and transform power supplied by said ring bus to a first load, the first load coupled in electrical parallel between the first DC power source and said first power converter such that the first load is isolated from said ring bus, and
   wherein said second power converter is configured to transform power supplied from a second DC power source to said ring bus and transform power supplied by said ring bus to a second load, the second load coupled in electrical parallel between the second DC power source and said second power converter such that the second load is isolated from said ring bus.

14. A DC power distribution system in accordance with claim 13, further comprising:
   a first alternating current (AC) to DC power converter comprising an input coupled to a first AC power source and an output coupled to said first distribution bus; and
   a second AC to DC power converter comprising an input coupled to a second AC power source and an output coupled to said second distribution bus.

15. A DC power distribution system in accordance with claim 14, further comprising:
   a first load configured to receive DC power from said first distribution bus; and
   a second load configured to receive DC power from said second distribution bus.

16. A DC power distribution system in accordance with claim 15, wherein upon the occurrence of a fault in said second distribution bus, said second power converter is configured to:
   draw a first level of DC power from said ring bus, the first level of DC power provided by said first distribution bus via said first power converter;
   condition the first level of DC power to a second level of DC power required by said second load; and
   provide the second level of DC power to said second load.

17. A DC power distribution system in accordance with claim 13, wherein said first distribution bus and said second distribution bus are connected to provide DC power to a same load.

18. A DC power distribution system in accordance with claim 13, wherein said first distribution bus and said second distribution bus are parallel-connected to provide DC power to at least one load.

* * * * *